United States Patent [19]

Saro et al.

[11] 4,264,255

[45] Apr. 28, 1981

[54] APPARATUS FOR STACKING FOLDING BOXES

[75] Inventors: Karl Saro, Ratingen; Willi Trosdorff, Unterbach, both of Fed. Rep. of Germany

[73] Assignee: Jagenberg Werke AG, Dusseldorf, Fed. Rep. of Germany

[21] Appl. No.: 49,719

[22] Filed: Jun. 18, 1979

[30] Foreign Application Priority Data

Jun. 23, 1978 [DE] Fed. Rep. of Germany ....... 2827540

[51] Int. Cl.³ ................................................ B65G 57/24

[52] U.S. Cl. ......................................... 414/31; 414/48; 414/50; 414/65

[58] Field of Search ............... 271/265, 270, 207, 213, 271/218, 220, 177; 414/30, 31, 48, 50, 55, 56, 65

[56] References Cited

U.S. PATENT DOCUMENTS

| | | | |
|---|---|---|---|
| 3,568,578 | 3/1971 | Fujishiro | 414/31 X |
| 3,902,609 | 9/1975 | Ohlsson | 414/31 X |
| 3,970,202 | 7/1976 | Speggiorin | 414/31 |
| 4,183,704 | 1/1980 | Steinhart | 414/31 |

*Primary Examiner*—Richard A. Schacher
*Attorney, Agent, or Firm*—Sprung, Felfe, Horn, Lynch & Kramer

[57] ABSTRACT

An apparatus for forming a regular stack of folding boxes wherein each box has unequal thicknesses at the end portions thereof. The apparatus has a conveyor belt for feeding the boxes and an upper and lower stacking station situated on two different planes. The boxes are fed from the conveyor belt only to the upper stacking station to form a partial stack thereon with light thickness ends in superposition. The partial stack from the upper stacking station by disposing a turntable from the lower stacking station vertically beneath the upper stacking station, providing displaceable floors in the upper stacking station to enable passage of a partial stack vertically downwardly to the turntable and mounting the turntable for rotation about a vertical axis to effect the stacking of successive partial stacks thereon with unlike thickness ends in superposition.

5 Claims, 5 Drawing Figures

APPARATUS FOR STACKING FOLDING BOXES

BACKGROUND OF THE INVENTION

The invention relates to an apparatus for forming a regular stack of folding boxes of unequal thickness at the ends.

An apparatus of the kind described above is disclosed by German Offenlegungsschrift No. 2,437,475. Such stacking apparatus are desirable at the output of a folding and gluing machine, since certain kinds of folding boxes have edges of different thickness. For example, the end that is on the bottom may consist of a five-ply layer of cardboard, while the upper end of the folding box consists of only two layers of cardboard. When such folding boxes are stacked, a stack, after reaching a certain height, would fall over if the boxes were all to be stacked one on the other in the same orientation. German Offenlegungsschrift No. 2,437,475 sets forth an automatic stacking apparatus which forms a first stack at a lower-level stacking station, and then feeds the oncoming folding boxes over additional conveyor belts to a higher-level stacking station, and then the one stack is turned over and laid on the other by an inverting means. In this apparatus the first stack is swung upward on a circular path and inverted, and then lowered onto the second stack. In this turnover movement the stack has to be guided between guiding surfaces. If the box sizes are different, the adjustment of these guide surfaces is difficult. In the further employment of the stack in the case of the previously known apparatus, it is also disadvantageous that the boxes in the two partial stacks are not all face up or face down, because the one stack was inverted on the other.

SUMMARY OF THE INVENTION

The object of the present invention is to develop a stacking apparatus in which the boxes are laid down in the same position for use, and which preferably permits the apparatus to be converted quickly for different sizes.

The object is achieved by the invention in that the folding boxes coming from the conveyor belt can be delivered only to the more elevated stacking station, this more elevated (upper) stacking station has a removable floor, and the less elevated (lower) stacking station equipped with a turntable is disposed vertically beneath the upper stacking station. The removable floor can be constituted, for example, by two halves which can be swung away or withdrawn, so that, when the floor is withdrawn the partial stack can be lowered vertically from the upper, shaft-like stacking station to the lower shaft-like stacking station. After the partial stack has been transferred to the lower stacking station, the floor of the upper stacking station is swung or shifted back into place, so that the next partial stack can be formed. During this formation of the second stack, the first partial stack is rotated 180° about a vertical axis by means of the turntable, so that afterwards the two partial stacks can be laid one on the other in a turned-about position with respect to one another.

It has proven advantageous for the turntable of the lower stacking station to be equipped with a gripper means which grasps the partial stack and compresses it during the rotation. An especially simple gripper can be constituted by providing the lower member or jaw of the gripper in the platform of the turntable and the upper member or jaw in the floor of the upper stacking station. For example, the upper jaw can form part of the floor, and for this purpose may have a hinged, spring-biased, horizontally extending member which, when the floor halves are withdrawn, is deflected downwardly against the spring bias under the weight of the partial stack, so that the partial stack can pass downwardly. After the partial stack has been lowered past the upper jaw, the latter is returned by the spring force to the horizontal position and then the upper and lower jaws can be drawn together to grip the partial stack.

The turntable is preferably able to be raised and lowered so as to permit different stack heights. It is furthermore desirable for the turntable to be equipped with a means for shifting the partial stack horizontally. Such a design makes the turntable suitable for a variety of sizes, since when the partial stack has been rotated 180° it can be shifted by the shifting means back under the second partial stack, so that it will be possible to lay the two partial stacks precisely one over the other.

Preferably, the upper stacking station is equipped with a transfer means which will more the partial stack that has just been formed from the upper stacking station to the lower stacking station. A transfer means of this kind can be constituted, for example, by a hydraulic or air cylinder acting against the top of the partial stack. This design is especially advantageous when combined with the turntable gripper means, since the hydraulic or air cylinder assures a reliable transfer of the partial stack to a position between the gripper jaws. There is no danger that a box might become stuck in the area of the upper jaw of the gripper.

In another advantageous embodiment, the counting system is equipped with a stop which controls the transport of the folding boxes towards the upper stacking station. It is desirable that the speed of the conveyor belt associated with the counting system be controlled with respect to the counting system. Thus, after a predetermined number of boxes sufficient to form the partial stack has passed under the counting device, it is possible to lower the stop, thereby preventing any more folding boxes from being fed to the upper stacking station. The conveyor belt associated with the counting system is then driven at a higher speed so as to carry rapidly all of the boxes which have passed the stop to the upper stacking station, so that then the first partial stack can be transferred as quickly as possible down to the lower stacking station. As soon as the preset number of boxes has been fed by the conveyor belt to the upper stacking station, the speed of the conveyor belt is restored to its original rate.

BRIEF DESCRIPTION OF THE INVENTION

An embodiment of the invention is represented in the appended drawing and is further explained below.

DETAILED DESCRIPTION OF THE INVENTION

Figure 1:
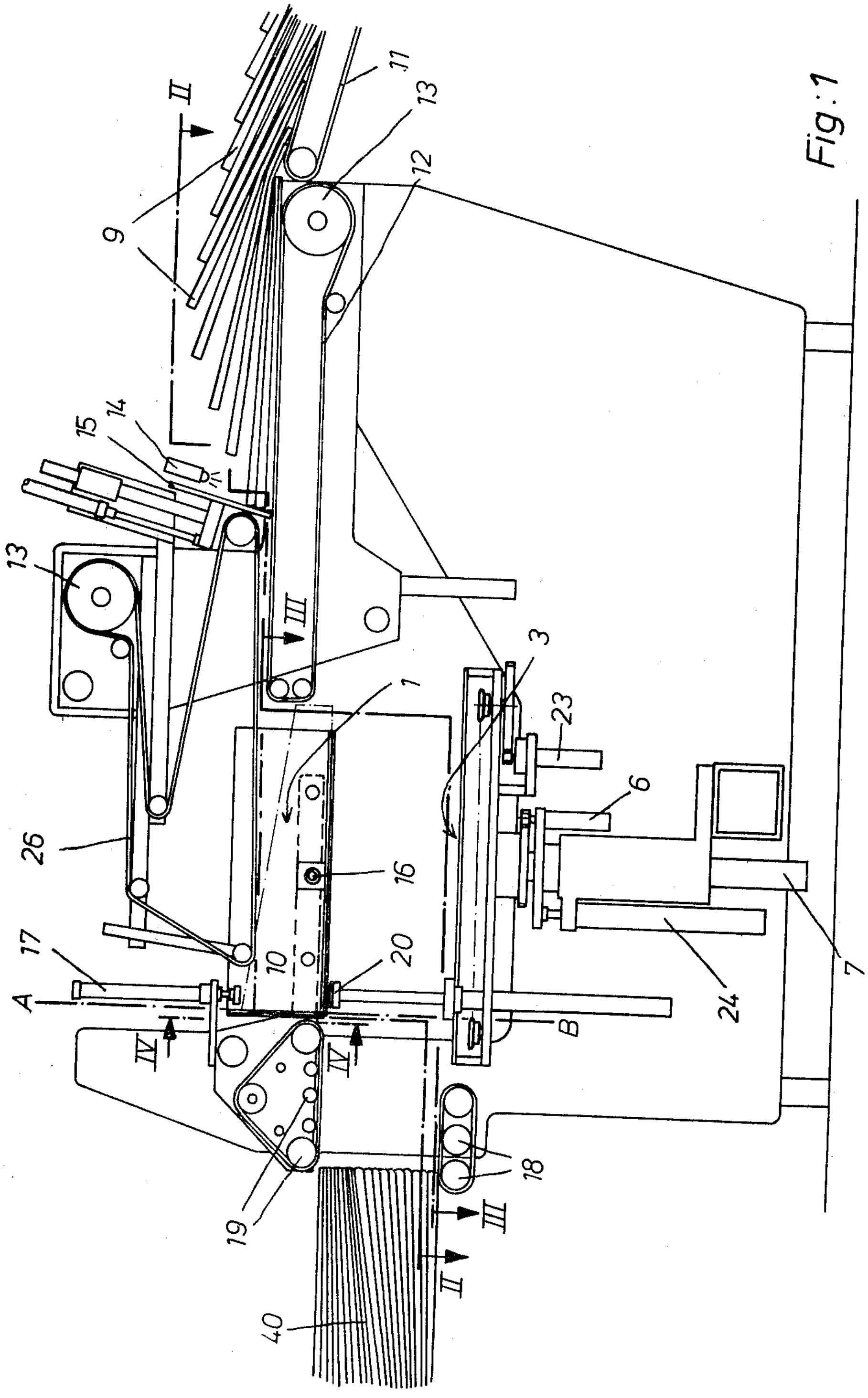
FIG. 1 is a diagrammatic side elevational view.

The apparatus has an upper stacking station 1 having a retractable floor 2, and a lower stacking station 3.

Stacking stations 1 and 3 are of a shaft-like construction. The lower stacking station is equipped with a turntable 4 which will be further described in conjunction with FIG. 3.

The folding boxes 9 come from a folding and gluing machine on a conveyor belt 11 to the conveyor belt 12. The conveyor belt 12 has a separate drive 13 which also drives an upper conveyor belt 26. The conveyor belts 12 and 26 can be driven at a higher speed than the conveyor belt 11. The conveyor belts 12 and 26 lead to the upper stacking station 1. With the conveyor belt there is associated the counting device which has an electronic sensing head 14 and a downwardly movable stop 15.

Figure 2:
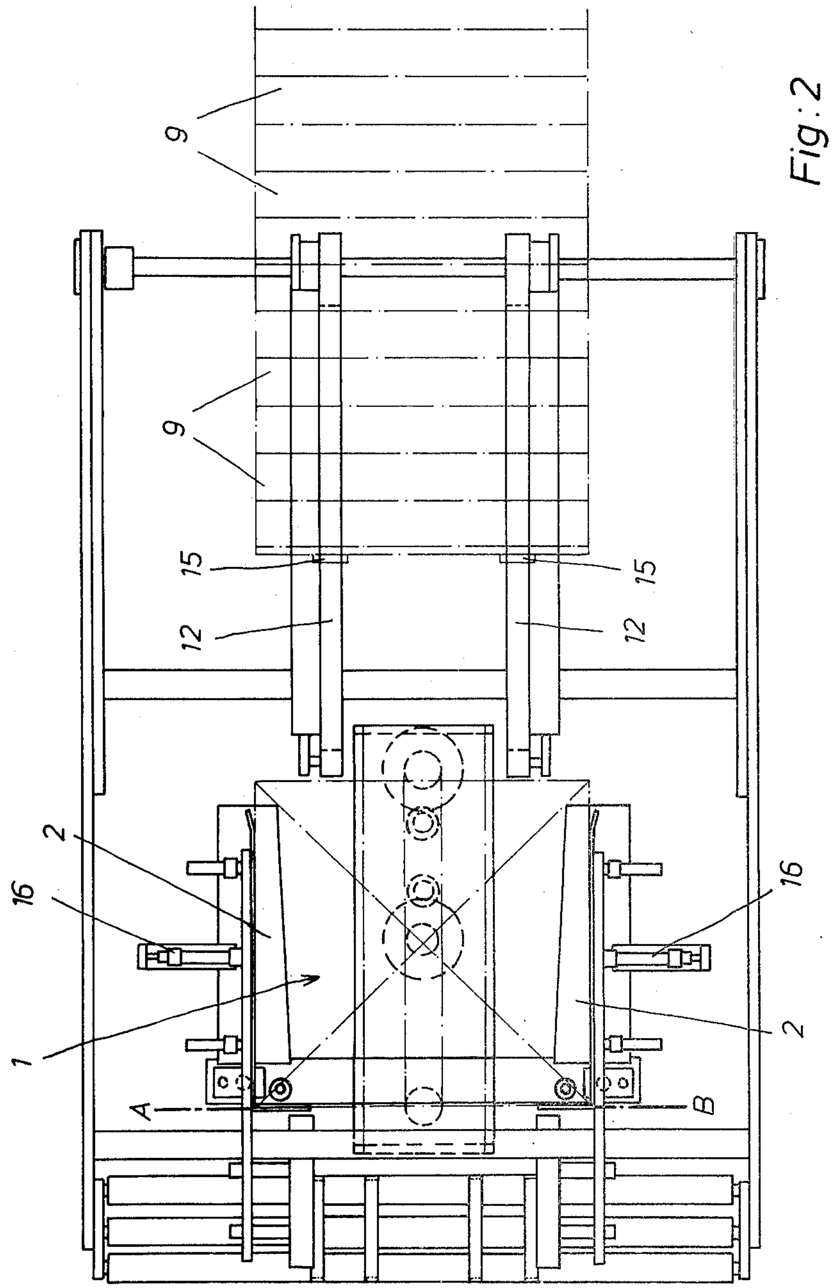
FIG. 2 is a cross-sectional view taken along line II—II of FIG. 1.
Figure 4:
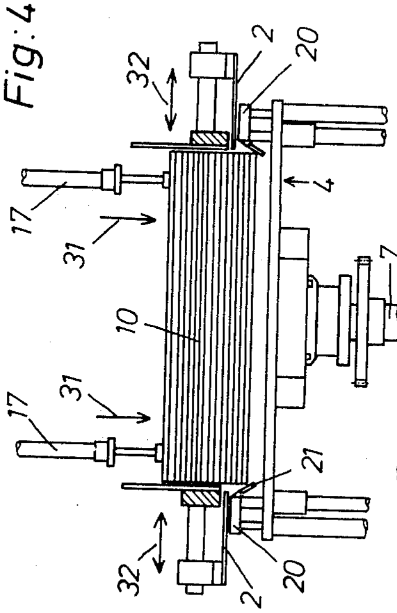
FIG. 4 is a cross-sectional view taken along line IV—IV of FIG. 1.
Figure 5:
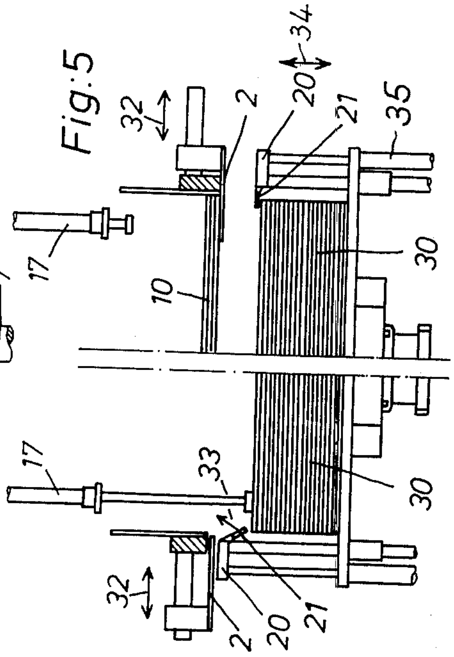
FIG. 5 represents the same subject as FIG. 4, each half showing it at different points in time.

As shown in FIGS. 2, 4 and 5, the upper stacking station 1 has a floor 2 composed of two retractable halves. The halves of the floor can be shifted apart by means of the hydraulic or air cylinders 16. Furthermore, two such cylinders 17 are disposed adjacent the upper stacking station 1, and press downwardly against the stack 10 formed at the stacking station 1 whernever the stack 10 is to be lowered. FIGS. 4 and 5 show that adjacent the lateral extremity of the retractable floor halves 2 there are upper gripper members 20 having on their inwardly facing edges the spring-biased flaps 21. The operation of these flaps 21 will be discussed later on.

Figure 3:
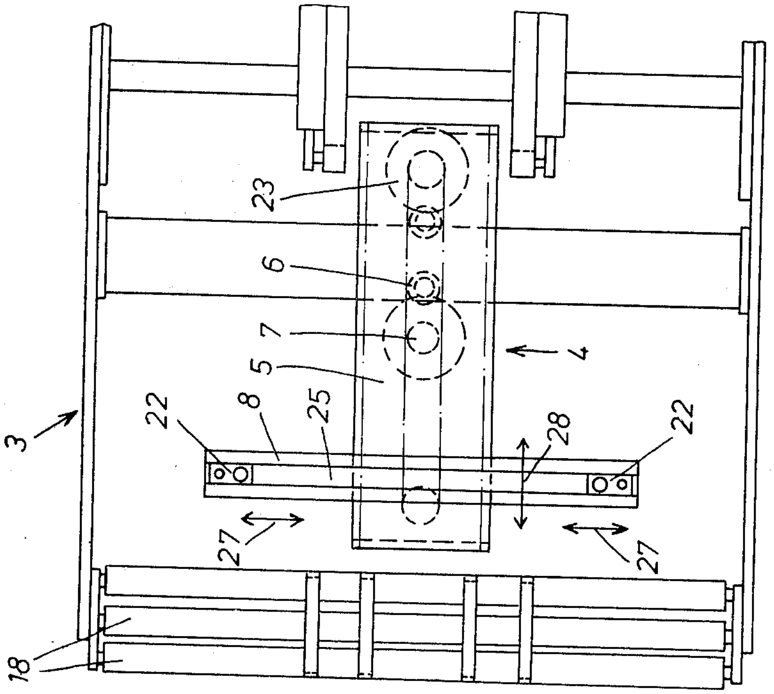
FIG. 3 is a cross-sectional view taken along line III—III of FIG. 1.

FIG. 3 is a top view of the turntable 4 of the lower stacking station 3. The turntable, which is generally designated by the number 4, has a rectangular top 5 which can be rotated by the motor 6 about the vertical shaft 7. Adjacent the left end of the table 5 there is disposed the gripper holder 8 extending transversely of the table 5. The gripper holder 8 has adjacent both its extremities grippers consisting each of the upper gripper member 20 and a lower gripper member 22. The grippers are displaceable parallel to the gripper holder 8 in the guides 25 thereof, as indicated by the arrow 27, so as to be adjustable to different folding box sizes. The gripper holder 8 is displaceable as a whole on the table 5 by means of the motor 23. The finished stack 40 is carried away by upper and lower rollers 18 and 19.

The detail drawings of FIGS. 4 and 5 are intended to explain how the partial stack 10 is transferred from the upper stacking station 1 to the lower stacking station 3.

FIGS. 4 and 5 show parts of the apparatus at three different points in time, first FIG. 4, then the left half of FIG. 5, and finally the right half of FIG. 5. The horizontal movement of the floor halves 2 of the upper stacking station 1 is indicated by the arrow 32. In the left half of FIGS. 4 and 5, the floor halves have been drawn outwardly, while in the right half of FIG. 5, the floor halves are shifted inwardly, so that a partial stack 10 can be formed at the upper stacking station 1. The phase of the transfer of partial stack 10 is represented in FIG. 4 and in the left half of FIG. 5.

The transfer means 17, hydraulic cylinders for example, exercise pressure in the vertical direction as indicated by the arrow 31. Since the floor halves 2 are retracted, the partial stack 10 is lowered vertically. At the same time the spring-biased flaps 21, which are situated on the inner edges of the upper gripper members 20, swing downwardly. After the upper edge of the stack passes them, the spring-biased flaps 21 can swing back to the horizontal position, and then, when the upper and lower gripper members 20 and 22 come together they exercise their gripping action. The swinging movement of the flaps 21 is indicated by the arrow 33 in the left half of FIG. 5.

The right half of FIG. 5 shows the partial stack 30 gripped by the flaps 21 of the upper gripper member 20 at the lower stacking station, and above the partial stack 30 is seen the partial stack 10, which is being built up and which rests on the inwardly shifted floor halves 2. In this position the plungers of the transfer means 17 are retracted to their upper, starting position.

The manner of the operation of the apparatus is as follows:

The folding boxes 9 coming from the folding and gluing machine are carried by conveyor belt 11 to conveyor belt 12. The transport speed of the conveyor belt 11 is determined by the folding and gluing machine and is always equal to the speed of the folding and gluing machine. The conveyor belts 12 and 26 with the separate drive 13 are designed such that they run sometimes at the speed of the conveyor belt 11 and sometimes at considerably greater speed. The change of speed is determined by the counting means consisting of the sensing head 14 and the stop 15. By means of the electronic sensing head 14, the counting system counts the number of the marked boxes and then lowers the stop 15 (as shown in FIG. 1). Then the conveyor belts 12 and 26 are driven at the higher speed, so that the counted remaining folding boxes 9 will be quickly conveyed to the upper stacking station 1, the conveyor belts 12 and 26 cooperating such as to assure a reliable laying down of the boxes 9. When all of the boxes 9 are at the upper stacking station 1 and thus a partial stack 10 of the desired height is formed, the floor halves 2 are shifted outwardly by means of the hydraulic cylinder 16, as indicated by the arrow 32. Then the partial stack 10, as already described in conjunction with FIGS. 4 and 5, is carried downward under the pressure of the transfer means 17 to the lower stacking station 3. The spring-loaded flaps 21 of the upper gripper member are deflected by the downwardly moving partial stack, and after the uppermost folding box 9 has passed them they snap back again, as indicated by the arrow 33 in the left half of FIG. 5. Then the upper gripper members 20 are driven by the cylinders 35 in the direction of the arrow 34 (in the illustrated case downwardly towards the lower gripper members 22) so that the partial stack 30 is securely held between the gripper members at the lower stacking station 3. The plungers of the hydraulic cylinders of the transfer means are raised up again and the floor halves 2 are shifted inward again, as indicated by the arrow 32. Now the second partial stack 10 can be formed at the upper stacking station 1 (FIG. 5, right half).

The lower stacking station serves as a magazine for the partial stacks 10 formed on the upper stacking station 1. The formation of the individual stacks of folding boxes 9 is performed only at the upper stacking station 1. The partial stack 10 formed of a plurality of folding boxes 9, when they achieve a given height, are transferred to the secondary, lower stacking station 3. The transferred partial stack bears the reference number 30.

After the transfer means 17 have retracted to their upper position and the floor halves 2 are shifted inwardly, the conveyor belts 12 and 26 can again operate at normal speed, i.e., the speed of the conveyor belts 12 and 26 is adapted to the speed of the conveyor belt 11. The stop 15 is withdrawn upwardly and the second partial stack 10 is counted by means of the sensing head 14.

In the meantime, the partial stack 30 on the turntable 4 is turned 180° as follows: first the turntable 4 is lowered by means of the raising and lowering cylinder 24 and then the table 5 is revolved by means of motor 6 180° about the vertical shaft 7. During this rotation, the motor 23 shifts the gripper holder 8 along with the partial stack in the direction of the arrow 28 until the back edge of the partial stack 30 comes into the position of line A–M (FIG. 1). After the rotation stops, the turntable 4 is raised by cylinder 24 until the uppermost box of the partial stack 30 is adjacent the lower edges of the floor halves 2. The second partial stack 10 that has been formed in the meantime is laid on the first partial stack 30 in the manner previously described. After the second partial stack 10 has been delivered onto the first partial stack 30 and the upper gripper member 20 has gripped by means of the spring-biased flaps 21 the entire stack 40 that has been formed, the latter is shifted outwardly to the left by means of the gripper holder 8, between the roller conveyors 18 and 19 and out of the stacking apparatus. A transfer means which is not represented carries the stack to an automatic strapping machine.

It will be appreciated that the instant specification and example are set forth by way of illustration and not limitation, and that various modifications and changes may be made without departing from the spirit and scope of the present invention.

What is claimed is:

1. In an apparatus for forming a regular stack of folding boxes wherein each box has unequal thicknesses at the ends thereof, the apparatus having a conveyor belt for feeding the boxes and an upper and lower stacking station situated on two different planes, the improvement comprising means for feeding boxes from the conveyor belt only to said upper stacking station to form a partial stack thereon with like thickness ends in superposition; and means for transferring the partial stack from the upper to the lower stacking station comprising the lower stacking station including a turntable disposed vertically beneath the upper stacking station, displaceable floor means in said upper stacking station to enable passage of the partial stack vertically downwardly to the turntable when the floor is displaced and to enable the formation of a partial stack on the upper stacking station when the floor is not displaced, means for raising and lowering the turntable, means for horizontally pushing the partial stack on the turntable and means for rotating the turntable about a vertical axis to effect the stacking of successive partial stacks thereon with unlike thickness ends in superposition.

2. The apparatus of claim 1, wherein the lower stacking station comprises gripper means for grasping the partial stack on the turntable.

3. The apparatus of claim 1 wherein the upper stacking station comprises transport means acting on the partial stack thereon in the vertical direction in coaction with the displaceable floor means.

4. The apparatus of claim 1, further comprising means for counting boxes fed to the upper stacking station and stop means responsive to the count for halting feeding of the folding boxes.

5. The apparatus of claim 4, wherein the counting means controls the speed of the feed means to the upper stacking station.

* * * * *